United States Patent
Crepaldi et al.

(10) Patent No.: US 8,699,627 B2
(45) Date of Patent: Apr. 15, 2014

(54) SYSTEMS AND METHODS FOR WIRELESSLY RECEIVING DATA

(75) Inventors: Marco Crepaldi, Biella (IT); Peter Kinget, Summit, NJ (US)

(73) Assignee: The Trustee of Columbia University in the City of New York, New York, NY (US)

( * ) Notice: Subject to any disclaimer, the term of this patent is extended or adjusted under 35 U.S.C. 154(b) by 0 days.

(21) Appl. No.: 13/498,801

(22) PCT Filed: Sep. 28, 2010

(86) PCT No.: PCT/US2010/050595
§ 371 (c)(1),
(2), (4) Date: Apr. 16, 2012

(87) PCT Pub. No.: WO2011/038414
PCT Pub. Date: Mar. 31, 2011

(65) Prior Publication Data
US 2012/0275549 A1    Nov. 1, 2012

Related U.S. Application Data

(60) Provisional application No. 61/246,529, filed on Sep. 28, 2009.

(51) Int. Cl.
*H03K 9/00*        (2006.01)
(52) U.S. Cl.
USPC ........... 375/316; 375/317; 375/319; 375/354; 375/340
(58) Field of Classification Search
USPC .......................... 375/316, 319, 317, 340, 354
See application file for complete search history.

(56) References Cited

U.S. PATENT DOCUMENTS

| | | | |
|---|---|---|---|
| 6,781,530 | B2 | 8/2004 | Moore |
| 7,190,722 | B2 | 3/2007 | Lakkis et al. |
| 2001/0041548 | A1 | 11/2001 | Bult et al. |
| 2004/0218687 | A1 | 11/2004 | Santhoff |
| 2005/0100102 | A1 | 5/2005 | Gazdzinski et al. |

(Continued)

OTHER PUBLICATIONS

Crepaldi, M., et al. "An Ultra-Low Power Interference Robust IR-UWB, Transceiver Using Self-Synchronizing OOK Modulation", In Proceedings of the International Solid-State Circuits Conference (ISSCC '10), San Francisco, CA, USA, Feb. 7-11, 2010, pp. 226-227.

(Continued)

*Primary Examiner* — Zewdu Kassa
(74) *Attorney, Agent, or Firm* — Byrne Poh LLP

(57) ABSTRACT

In accordance with some embodiments, receivers for receiving a wireless data transmission are provided, the receivers comprising at least one amplifier that receives an RF input signal and produces at least one amplified signal; a mixer that mixes the at least one signal to produce a mixed signal; a filter that filters the mixed signal to produce a filtered signal, a comparator that compares the filtered signal to a threshold voltage and produces a digital signal, a first pulse generate i that generates a first pulse in response to a transition in the digital signal, a second pulse generator that generates a second pulse that is longer than the first pulse in response to a transition in the digital signal; and digital logic that generates a clock output and that generates a data output based on a state of the first pulse when the second pulse expires.

20 Claims, 11 Drawing Sheets

(56) References Cited

U.S. PATENT DOCUMENTS

| | | | |
|---|---|---|---|
| 2005/0213635 A1* | 9/2005 | Terada et al. | 375/130 |
| 2006/0018369 A1 | 1/2006 | Sanada et al. | |
| 2006/0071718 A1 | 4/2006 | McCorquodale et al. | |
| 2006/0098713 A1* | 5/2006 | Tian | 375/130 |
| 2006/0198474 A1 | 9/2006 | Sorrells et al. | |
| 2008/0056419 A1* | 3/2008 | Lee et al. | 375/355 |
| 2008/0069183 A1* | 3/2008 | Terada | 375/137 |

OTHER PUBLICATIONS

Daly. D.C. et al., "A Pulsed UWB Receiver SoC for Insect Motion Control". In IEEE Journal of Solid State Circuits, vol. 45, No. 1, Jan. 2010, pp. 153-166.

Diao, S., et al., "A CMOS Ultra Low-Power and Highly Efficient UWB-IR Transmitter for WPAN Applications", In IEEE Transaction on Circuits and Systems—Part II: Express Briefs, vol. 56, No. 3, Mar. 2009, pp. 200-204.

International Preliminary Report on Patentability in International Patent Application No. PCT/US2010/050595, filed Sep. 28, 2010, mailed Apr. 12, 2012.

International Search Report in International Patent Application No. PCT/US2010/050595, filed Sep. 28, 2010, mailed Nov. 24, 2010.

Lachartre, D., et al., "A 1.1nJ/b 802.15.4a—Compliant Fully Integrated UWB Transceiver in 0.13μm CMOS", In Proceedings of the IEEE International Solid State Circuit Conference (ISSCC '09). Digest of Technical Papers, San Francisco, CA, USA, Feb. 8-12, 2009, pp. 312-313.

Lee. F.S. and Chandrakasan, A. P., "A 2.5 nJ/bit 0 65V Pulsed UWB Receiver in 90nm CMOS", In IEEE Journal of Solid-State Circuits, vol. 42, No. 12, Dec. 2007, pp. 2851-2859.

Nejad, M.S., "Ultra Wideband Impulse Radio for Wireless Sensing and Identification", Doctoral Thesis, KTH—Royal Institute of Technology, Dec. 2008, pp. 1-72.

Norimatsu, T., et al., "A UWB-IR Transmitter with Digitally Controlled Pulse Generator". In IEEE Journal of Solid-State Circuits, vol. 42, No. 6, Jun. 2007, pp. 1300-1309.

Smaini, L., et al., "Single-Chip CMOS Pulse Generator for UWB Systems", In IEEE Journal of Solid-State Circuits, vol. 41, No. 7, Jul. 2006, pp. 1551-1561.

Tamtrakarn, A., et al., "A 1-V299μW Flashing UWB Transceiver Based on Double Thresholding Scheme", In Proceedings of the IEEE Symposium on VLSI Circuits, Digest of Technical Papers, Honolulu, HI, USA, Jun. 15-17, 2006, pp. 202-203.

Terada, T., et al., "A CMOS Ultra-Wideband Impulse Radio Transceiver for 1-Mb/s Data Communications and±2.5-cm Range Finding", In IEEE Journal of Solid-State Circuits, vol. 41, No. 4, Apr. 2006, pp. 891-898.

Verhelst, M., et al., "A Reconfigurable 0.13μm CMOS 110pJ/pulse, Fully Integrated IR-UWB Receiver for Communication and Sub-cm Ranging", In Proceedings of the IEEE International Solid-State Circuits Conference (ISSCC '09), San Francisco, CA, USA, Feb. 8-12: 2009, pp. 250-251.

Wentzloff, D.D. and Chandrakasan, A.P., "A 47 pJ/pulse 3.1-to-5 GHz All-Digital UWB Transmitter in 90nm CMOS", In Proceedings of the IEEE International Solid-State Circuits Conference (ISSCC '07), San Francisco, CA, USA, Feb. 11-15, 2007, pp. 118-119.

Written Opinion in International Patent Application No. PCT/US2010/050595, tiled Sep. 28, 2010, mailed Nov. 24, 2010.

\* cited by examiner

SYSTEMS AND METHODS FOR WIRELESSLY RECEIVING DATA

CROSS REFERENCE TO RELATED APPLICATION

This application claims the benefit of United States Provisional Patent Application No. 61/246,529, filed Sep. 28, 2009, which is hereby incorporated by reference herein in its entirety.

TECHNICAL FIELD

The disclosed subject matter relates to systems and methods for wirelessly receiving data.

BACKGROUND

Impulse-Radio Ultra-Wide-Band (IR-UWB) is different from conventional Narrow-Band (NB) and Wide-Band (WB) wireless technologies. Transmission in IR-UWB relies on the use of very short duration pulses e.g., smaller than 4 ns) and has average power spectral densities orders of magnitudes smaller than in other wireless systems.

In 2002, the United States Federal Communications Commission (FCC) specified a mask for bounding emissions from UWB transmitters to at least 500 MHz bandwidth in the 3.1-10.6 GHz range with average Power Spectral Densities (PSD) of −41.3 dBm/MHz in indoor environments. IR-UWB facilitates such low-power transmissions because of its use of low-duty cycle techniques applicable at the transmitters (e.g., 1 M pulse/s means at most 4 ns of duty cycle for each 1 μs offline). These low power transmissions make IR-UWB well suited for "tags" in sensor networks where low-cost and low-complexity are very important issues.

The most common schemes for implementing IR-UWB receivers rely on enemy detection with two pulse position modulation (2-PPM). In such schemes, information is transmitted according a time delay of UWB pulses in a constant pulse repetition interval (PRI). Accordingly, it is typically necessary to have a precise clock for timing acquisition and demodulation and to have dedicated units such as crystal oscillators, Phase-Locked-Loops (PLL), and Delay-Locked-Loops (DLL).

Unfortunately, however, precise clocks, crystal oscillators, Phase-Locked-Loops (PLL), and Delay-Locked-Loops (DLL) are typically area-consuming and power-greedy because they typically require large settling times and need to run during the entire data demodulation and synchronization period.

SUMMARY

Systems and methods for wirelessly receiving data are provided. In accordance with some embodiments, receivers for receiving a wireless data transmission are provided, the receivers comprising: at least one amplifier that receives an RF input signal and produces at least one amplified signal; a mixer that mixes the at least one signal to produce a mixed signal; a filter that filters the mixed signal to produce a filtered signal; a comparator that compares the filtered signal to a threshold voltage and produces a digital signal; a first pulse generator that generates a first pulse in response to a transition in the digital signal; a second pulse generator that generates a second pulse that is longer than the first pulse in response to a transition in the digital signal; and digital logic that generates a clock output and that generates a data output based on a state of the first pulse when the second pulse expires.

In accordance with some embodiments, methods for receiving a wireless data transmission are provided, the methods comprising: receiving an RF input signal and produces at least one amplified signal; mixing the at least one signal to produce a mixed signal; filtering the mixed signal to produce a filtered signal; comparing the filtered signal to a threshold voltage and producing a digital signal; generating a first pulse in response to a transition in the digital signal; generating a second pulse that is longer than the first pulse in response to a transition in the digital signal; and generating a clock output and generating a data output based on a state of the first pulse when the second pulse expires.

DETAILED DESCRIPTION

Systems and methods for wirelessly receiving data are provided.

In accordance with some embodiments, a modulation scheme called Synchronized-OOK (S-OOK) can be used. A shown in FIG. 1, in S-OOK, two pulses, called a synchronization pulse and a data pulse, are transmitted. The first pulse (the synchronization pulse) causes synchronization between the transmitter and the receiver. The second pulse (the data pulse) is used to convey information between the transmitter and the receiver. More particularly, when the data pulse is present within a given time frame after the synchronization pulse, a "1" is conveyed from the transmitter to the receiver, and when the data pulse is not present in that time frame, a "0" is conveyed from the transmitter to the receiver. In some embodiments, the presence of a data pulse can alternatively be used to represent the receipt of a "0", and the absence of a data pulse can be used to represent the receipt of a "1".

Figure 2:
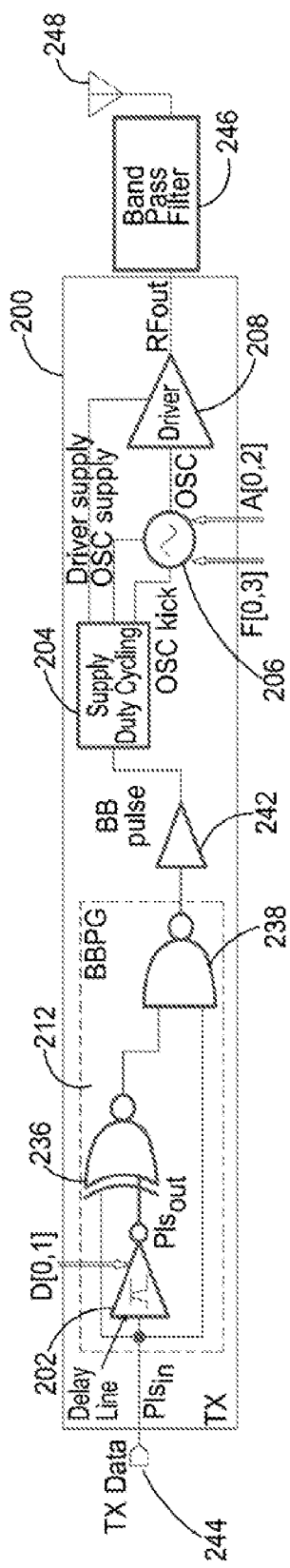
FIG. 2 is a block diagram of a transmitter that can be used in accordance with some embodiments.

Turning to FIG. 2, an example of a transmitter architecture 200 that can be used in some embodiments is illustrated. As shown, the transmitter architecture can include base-band pulse logic 212, butlers 242, a supply-duty cycling unit (S-DC) 204, an oscillator 206, and a 50Ω driver 208.

Base-band pulse logic 212 produces a digital pulse whenever a TX data signal at terminal 244 transitions from a zero to a one. This digital pulse is generated by performing a logical XOR operation (using gate 236) on the TX data signal and a complementary delayed version of it, which is obtained from a delay line 202. In some embodiments, the pulse duration is in the range of 2 ns to 3.5 ns. The digital pulse from gate 236 is then passed through NAND gate 238, which ensures that the generation of the digital pulse only occurs after positive edge transitions of the TX data signal.

After being buffered by buffers 242, the base-band pulse is the provided to the S-DC. The S-DC dynamically generates the power supply to the oscillator and to the output driver ensuring that they will function only during pulse transmissions. The S-DC unit also generates a shorter and less-precise signal to "kick" the oscillator on, allowing a very fast turn-on time while switching from an "OFF" condition to an "ON" condition. The oscillator output is applied to an antenna through the 50Ω driver.

In some embodiments, the transmitter can receive inputs for controlling its center frequency via inputs F[0]-F[3], amplitude via inputs A[0]-A[2], and bandwidth via input D[0]-D[1].

Because the generated UWB pulse may not comply with FCC mask requirements (e.g., in the GPS band (960-1610 MHz)), a band pass filter 246 (such as a GPS band pass filter) can be used in some embodiments.

Figure 3:
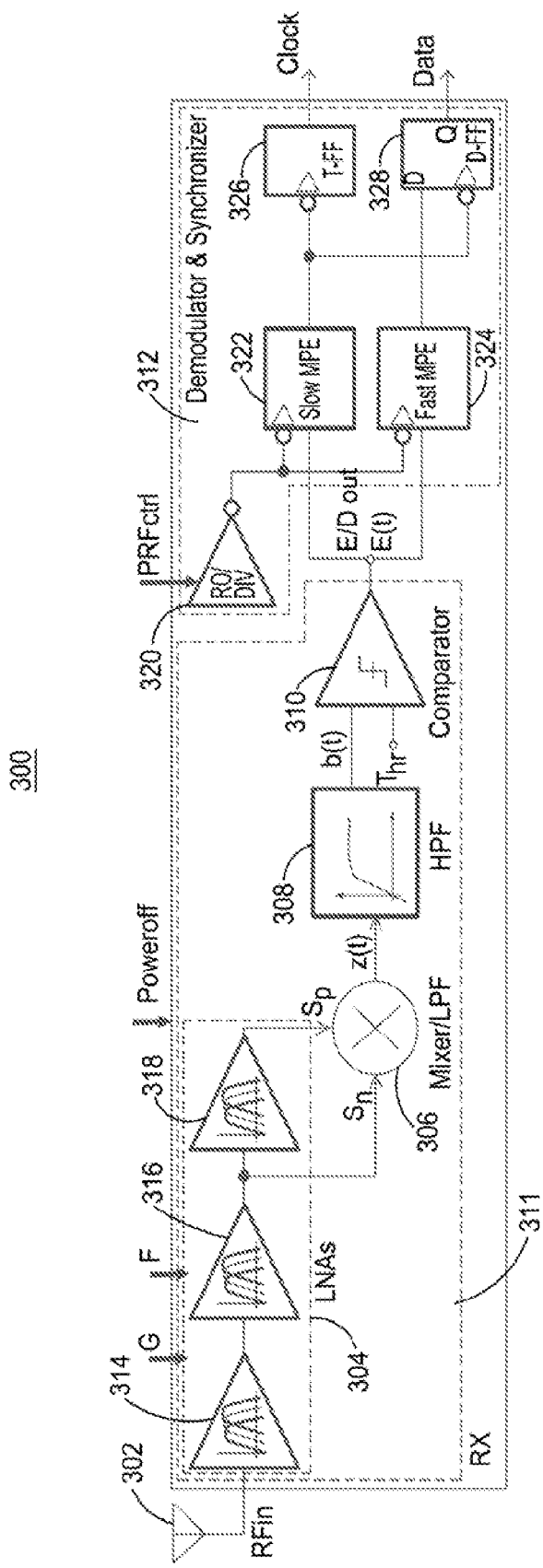
FIG. 3 is a block diagram of a receiver that can be used in accordance with some embodiments.
Figure 4:
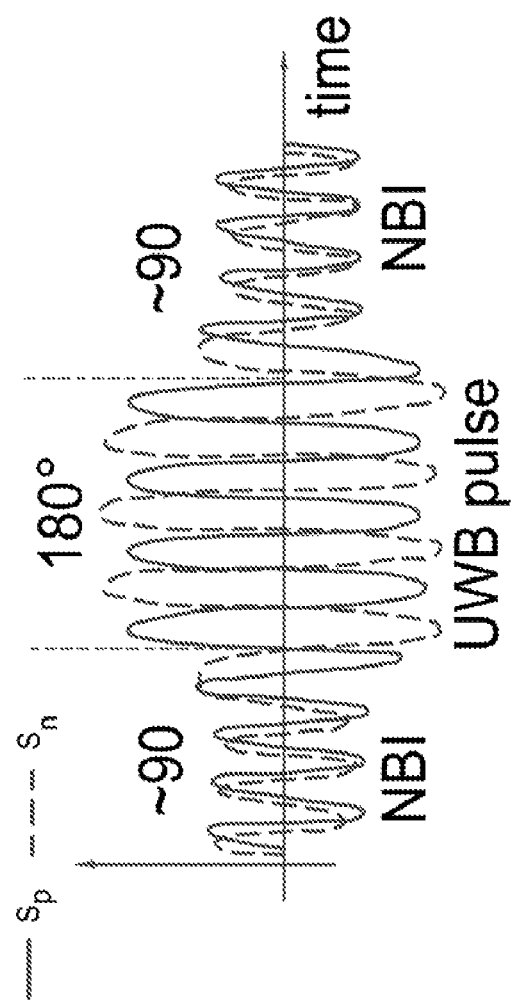
FIG. 4 is a diagram of signals $s_p$ and $s_n$ that can be produced in a receiver in accordance with some embodiments.

FIG. 3 illustrates a block diagram of a receiver 300 that can be used in some embodiments. As shown, receiver 300 is coupled to an antenna 302 and includes an analog front-end 311 and a digital back-end 312. After an RF input signal is received by antenna 302, it is filtered and amplified by three LC tuned low noise amplifiers (LNAs) 314, 316, and 318. In response to the RF input signal, the second amplifier (LNA 316) and the third amplifier (LNA 318) produce differential outputs $s_p$ and $s_n$, respectively. As illustrated in FIG. 4, the tuned amplifiers 314, 316, and 318 cause a phase rotation between $s_p$ and $s_n$ of 180 degrees at the resonance frequency of the LNAs, while, for out-of-band jammers, the phase rotation is closer to +/−90 degrees.

Figure 5B:
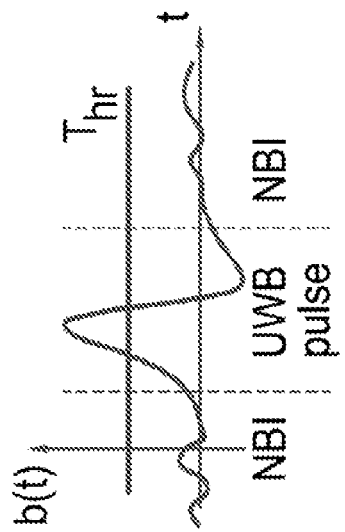
FIGS. 5a and 5b are time domain diagrams of signals z(t) and b(t) that can be produced in a receiver in accordance with some embodiments.
Figure 5A:
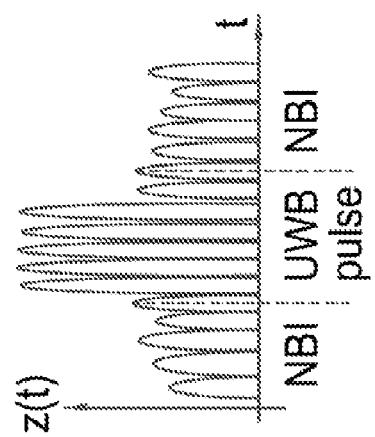

These differential outputs $s_p$ and $s_n$ are then processed by mixer 304 as $(s_p-s_n)^2$ to obtain a base-band signal. Mixer 304 then also performs a low pass filter (LPF) function on the signal being output by the mixer. As a result of the mixing of the phase rotated signals by mixer 304, narrowband interference rejection is provided. This process can increase the Signal-to-Interference Ratio of the receiver for the pulse by 2.5 dB. An example of a signal corresponding to a received pulse corrupted with narrow band interference as output by mixer 304 before low pass filtering is illustrated in FIG. 5a.

After mixing and low pass filtering by mixer 304, the signal is filtered by high pass filter (HPF) 308. An example of a signal corresponding to a received pulse as output by HPF 308 is illustrated in FIG. 5b.

Finally, in the receiver front end, the analog base-band pulse is converted to a logic pulse using threshold comparator 310 that compares the output of HPF 308 to a threshold voltage ($T_{hr}$). In accordance with some embodiments, this threshold voltage ($T_{hr}$) can be set so that the false trigger probability by noise when no pulse is transmitted is less than $10^{-6}$.

Next, in receiver back-end 312, the logic pulse produced by receiver front-end 311, which can be asynchronous, is processed to produce as data output and an associated output clock. As described further below, back-end 312 synchronizes the pulses, demodulates data, and filters out pulses replicas due to multi-paths in the wireless channel at the same time using two parallel Multi-Path-Erasers (MPEs)—a slow Multi-Path-Eraser (slow MPE) and a fast Multi-Path-Eraser (fast MPE). More particularly, every time a synchronization pulse is received, the fast MPE generates a short count pulse and the slow MPE generates a long count pulse. After the short count pulse subsequently expires, but while the long count pulse is still active, if a data pulse is received, the fast MPE re-triggers the short count pulse. When the long count pulse expires, it triggers a clock output and latches the state of the short count pulse as the data output—i.e., a "1" is output if the short count pulse has been re-triggered (and is, thus, active) and a "0" is output if the short count pulse has not been re-triggered (and is, thus, expired).

In accordance with some embodiments, to allow frequency and gain adjustments, the front-end can be controlled by calibration inputs for adjusting the resonance frequency and the gain of the tuned amplifiers. The receiver front-end can also include a poweroff signal that turns-off and turns-on portions of the front-end in order to lower power consumption of the receiver in accordance with some embodiments.

Figure 6:
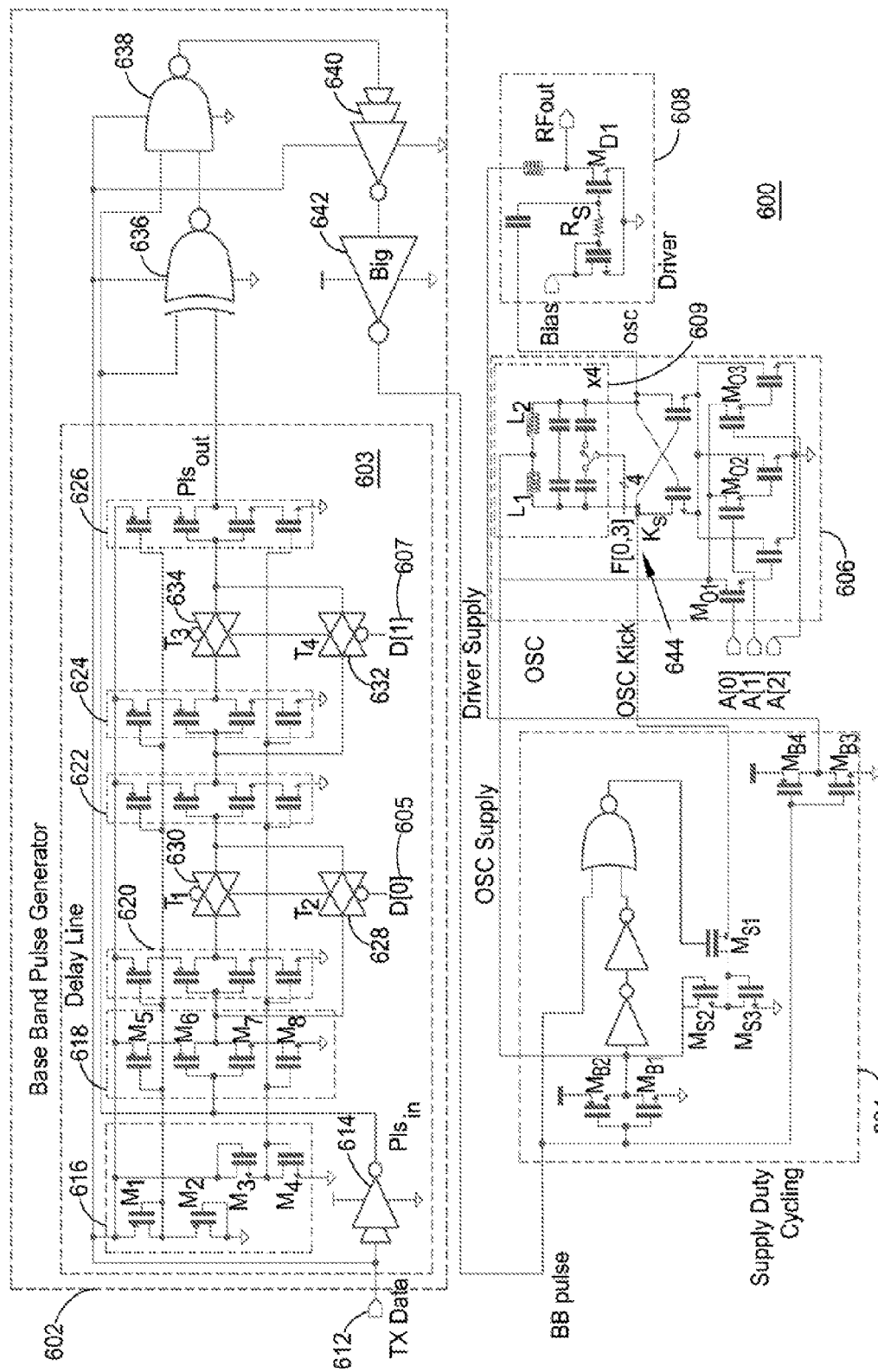
FIG. 6 is a schematic diagram of a transmitter that can be used in accordance with some embodiments.

FIG. 6 shows an example of a schematic for a transmitter 600 that can be used in some embodiments. Transmitter 600 can include a base-band pulse generator 602, a supply duty cycling unit (S-DC) 604, an oscillator circuit 606, and a driver circuit 608.

Base-band pulse generator (BBPG) 602 includes a delay line 603, an NXOR gate 636, a NAND gate 638, and buffers 640 and 642. The BBPG receives an OOK digital signal at terminal 612 and generates short duration pulses of nominally 2.5 ns. In some embodiments, delay line 603, NXOR gate 636, NAND gate 638, and buffers 640 can be powered on when TX data signal is asserted high.

After the OOK digital signal is received, delay line 603 produces a delayed version of the OOK digital signal from regeneration buffers 614. In some embodiments, process, voltage, and temperature variation (PVT) compensation can be provided by two pairs of diode-connected MOSFETs $M_{1-4}$ 616 that generate bias points for current starved inverter cells 618, 620, 622, and 624 in delay line 603. In some embodiments, the delay line can be implemented with inputs D[0] 605 and D[1] 607 that select whether delay elements formed by cells 620 or 624 contribute to the delay provided by delay line 603. The signal from transmission gates $T_{1-4}$ is then provided to buffer 626, which provides a delayed version of the OOK digital signal at terminal 612 to NXOR gate 636. At the NXOR gate, the OOK digital signal from buffers 614 and the delayed version of the OOK digital signal are used to produce a base-band pulse. The base-band pulse is then provided to NAND gate 638, which only passes the base-band pulse when it occurs on a rising edge of the TX data signal from buffers 614, and then the passed base-band pulses are buffered by buffers 640 and 642 to output a base-band pulse from the BBPG. As described below, when the TX data signal is low, the output of buffer 642 remains high thus deactivating S-DC 604, oscillator circuit 606, and driver circuit 608.

Supply duty cycling unit (S-DC) 604 receives the base-band pulse from the BBPG and generates three pulses: an oscillator supply signal, a driver supply signal, and an oscillator kick-off signal. The oscillator supply signal and the driver supply signal provide power to oscillator circuit 606 and driver circuit 608 only when a base-band pulse is to be transmitted. These supply signals are generated by inverting buffers formed from transistors $M_{B1}$ and $M_{B2}$, and $M_{B3}$ and $M_{B4}$ in SD-C 604. In some embodiments, the aspect ratios of these inverting buffers are large to support high current peaks in the supply signals. Once the oscillator supply signal is active after a base-band pulse has been received, transistors $M_{S1}$, $M_{S2}$, and $M_{S3}$ generate the oscillator kick-off signal, which stimulates an LC-tank 609 to start oscillations in the oscillator circuit by forcing the voltage at node 644 of the oscillator to Vdd/2 (i.e., the bias voltage generated by $M_{S2}$ and $M_{S3}$), thus helping to start the oscillations. In some embodiments, the oscillator circuit can be implemented with an LC-tank oscillator having inductors $L_1$ and $L_2$ integrated as a single differential inductor.

In some embodiments, four control bits F[0,3] can be used to change the size of a capacitor array in LC tank 609 so that tuning of the frequency of the oscillator can be achieved. In some embodiments, the value of each succeeding pair of capacitors in the LC tank can be scaled by a factor of two over the preceding pair of capacitors in order to provide a wide range of available capacitances.

In some embodiments, the amplitude of oscillator 606 can be controlled by three digital inputs A[1-3] that activate transistors $M_{O1}$-$M_{O3}$ and modify the bias current of the oscillator circuit and the amplitude of the oscillation signal.

The oscillator circuit output signal can then be provided to driver circuit 608, which can then be used to provide an RF output signal to a band pass filter 246 and an antenna 248 (as shown in FIG. 2).

Figure 7A:
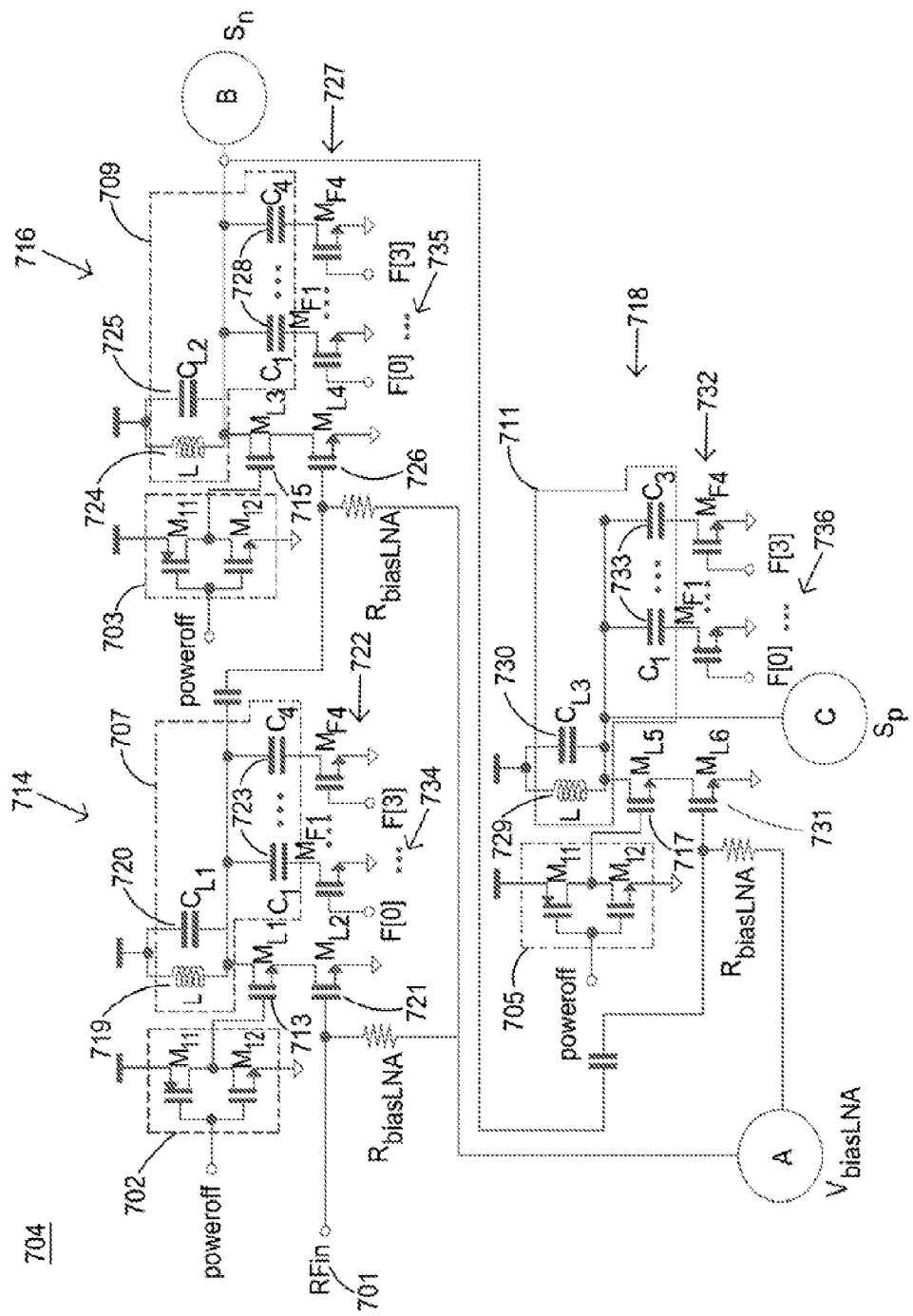
FIGS. 7a, 7b, and 7c are schematic diagrams of portions of a receiver front-end that can be used in accordance with some embodiments.
Figure 7B:
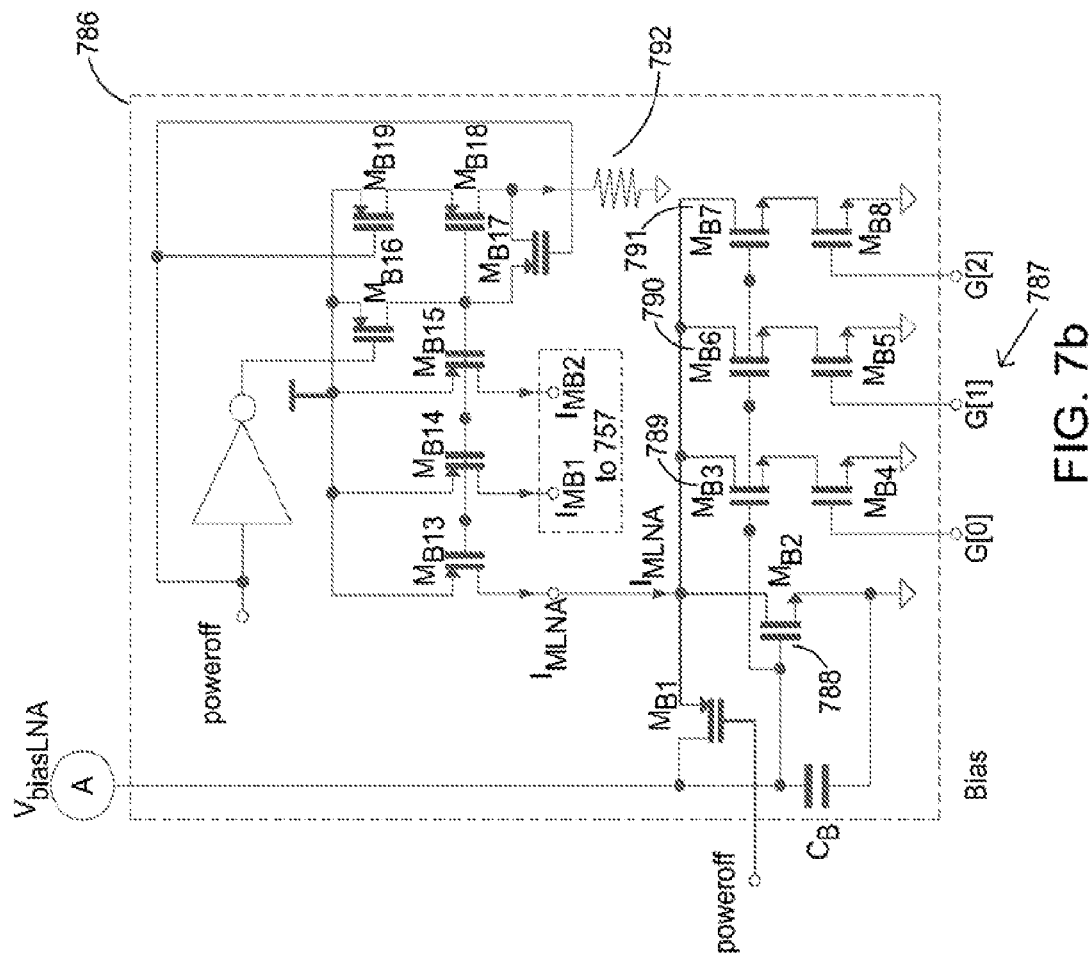
Figure 7C:
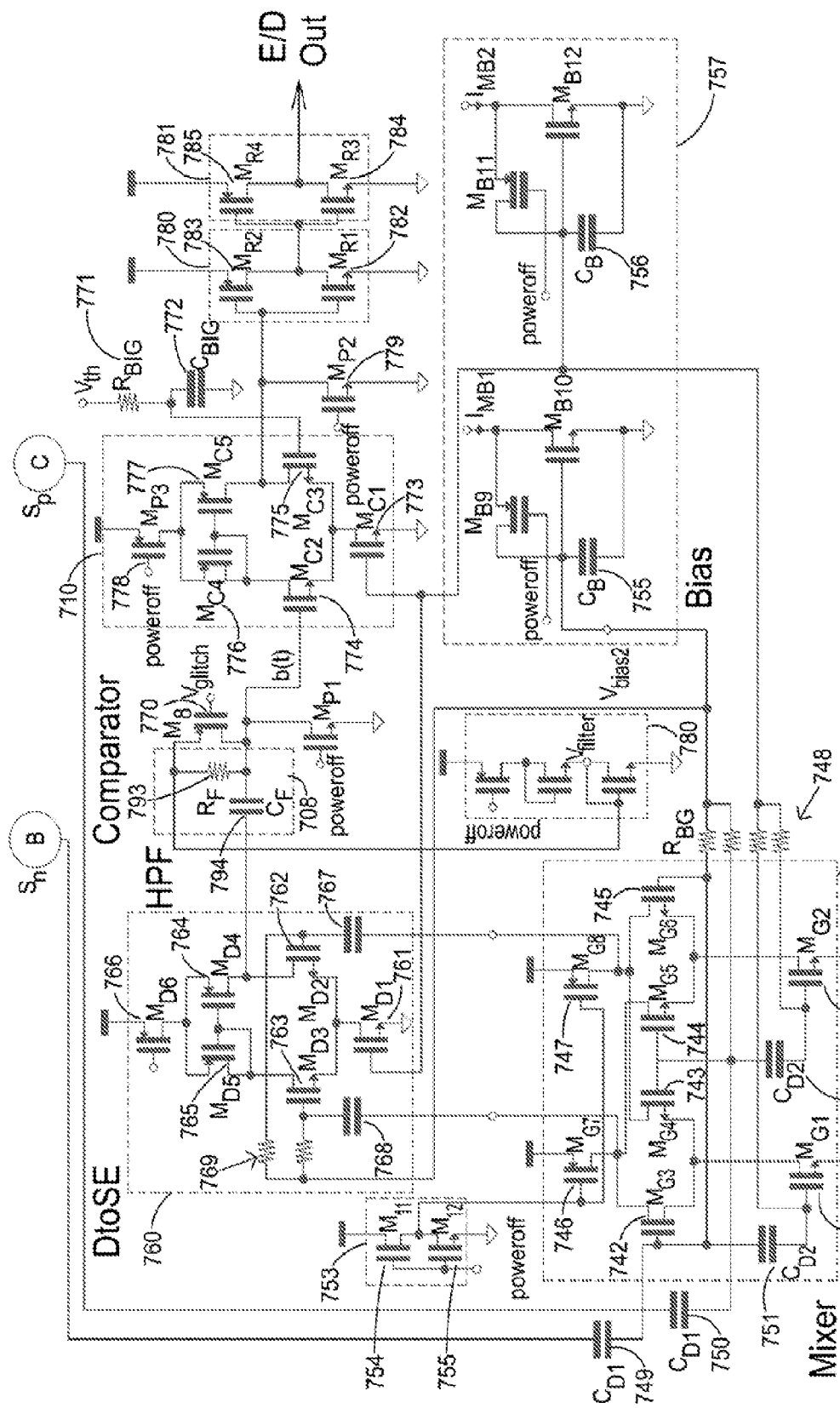

FIGS. 7a, 7b, and 7c show an example of a schematic for a receiver that can be used in some embodiments.

As illustrated in FIG. 7a, this receiver includes a cascade 704 of low noise amplifiers 714, 716, and 718. In cascade 704, an RF input signal at point 701 is amplified by amplifier 714, and then amplified again by amplifier 716, and then amplified again by amplifier 718. As shown in this figure, cascade 704 can be implemented with low-Q band pass amplifiers 714, 716, and 718 that match the bandwidth (e.g., 500 MHz of the pulses transmitted by the transmitter in order to filter the received RF signal. At the output of amplifier 716 is an output signal $S_n$, and at the output of amplifier 718 is an output signal $S_p$.

As shown, each of low noise amplifiers 714, 716, and 718 is cascoded by cascode transistors $M_{L1}$ 713, $M_{L3}$ 715, and $M_{L5}$ 717, respectively, to improve the amplifiers' reverse isolation.

As also shown in FIG. 7a, filtering in amplifiers 714, 716, and 718 can be performed by LC tanks 707, 709, and 711, respectively. LC tanks 707, 709, and 711 can include inductors L 719, 724, and 729, respectively, capacitors $C_{L1}$ 720, $C_{L2}$ 725, and $C_{L3}$ 730, respectively, and capacitors $C_1$-$C_4$ 723, 728, and 733, respectively. In some embodiments, the resonance frequency of LC tanks 707, 709, and 711 can be varied by electrically adding or removing capacitors $C_{1-4}$ 723, 728, and 733 to/from the LC tanks using transistor switches $M_{F1}$-$M_{F4}$ 722, 727, and 732 as controlled by inputs F[0] through F[3] 734, 735, and 736, respectively. In some embodiments, the resonance frequency of the LC tanks can be adjusted through a range of 3.5-4.3 GHz. In some embodiments, the values of load capacitors $C_{L1}$-$C_{L3}$ 720, 725, and 730 are 88 fF and the values of capacitors $C_1$-$C_4$ are 32, 54, 88 and 137 fF, respectively, although any suitable values for these capacitors can be used. Since the RF signal is UWB and spans several hundreds of MHz, very accurate control of the LC tank resonance frequency is not fundamental, even for the differential self-mixing. In some embodiments, inductors L 719, 724, and 729 can be 4 nH each and can be caged to avoid coupling, although any suitable values for these inductors can be used. In some embodiments, the cascade 704 of amplifiers 714, 716, and 718 can result in a quality factor of 7, and the front end can have a simulated noise figure of 6 dB.

After cascade 704 has amplified and filtered the RF input signals, output signals $S_n$ and $S_p$ of the cascade are next processed by mixer 706 as shown in FIG. 7c. As illustrated, mixer 706 includes a Gilbert Cell that includes transistors $M_{G1}$-$M_{G8}$ 740-747. Output signals $S_n$ and $S_p$ from cascade 704 are AC coupled to transistors $M_{G1}$ 740 and $M_{G2}$ 741 of the Gilbert Cell by capacitors $C_{D1}$ 749, $C_{D2}$ 751 and $C_{D1}$ 750, $C_{D2}$ 752, respectively. MOSFETs $M_{G7}$ 746 and $M_{G8}$ 747 operate as linear resistive loads in the Gilbert Cell. Using MOSFETs $M_{G7}$ 746 and $M_{G8}$ 747 as linear resistive loads enables the mixer to be turned-on and turned-off quickly.

As also illustrated in FIG. 7c, the Gilbert Cell in mixer 706 is biased through resistors $R_{BG}$ 748 by bias voltages from bias circuitry 757.

The output of mixer 706 is next provided to differential-to-single-ended amplifier circuit (DtoSE) 760. DtoSE 760 includes transistors $M_{D1}$-$M_{D6}$ 761-766. As shown in FIG. 7c, and as its name implies. DtoSE 760 receives a differential pair of signals from the output of mixer 706, amplifies the signals, and provides a corresponding single-ended output signal using transistors $M_{D2}$-$M_{D5}$ 762-765. The differential pair of signals is received at the gates of transistors $M_{D2}$ 762 and $M_{D3}$ 763 via AC coupling capacitors 767 and 768.

The output of DtoSE 760 is next provided to high pass filter (HPF) 708 formed from resistor $R_F$ 793 and capacitor $C_F$ 794. As discussed above, the mixer current output signal through $M_{G3}$ 742, $M_{G4}$ 743, $M_{G5}$ 744, and $M_{G6}$ 745 is low pass filtered by the combination of the load transistors $M_{G7}$ 746 and $M_{G8}$ 747 biased as resistors and the parasitic capacitances at the output nodes when converted into the output voltage. The HPF provides additional high-pass filtering that results in a net band pass filter (BPF) being applied to the mixer output. The high-pass and low-pass cutoff frequencies $f1$ and $f2$ of the resulting BPF can be 10 MHz and 250 MHz, respectively, in some embodiments, although any suitable values can be used. These frequencies correspond to half of the maximum Wide-Band IEEE 802.11a interference bandwidth and half of the maximum UWB signal bandwidth. A bias voltage $V_{filter}$ provided by bias circuit 780 to HPF 708 can be 420 mV, or any other suitable value, in some embodiments.

After being filtered by the high pass filter, the signal is applied to analog comparator 710, formed by transistors $M_{C1}$-$M_{C5}$ 773-777, which compares the filtered signal to a threshold voltage ($V_{th}$). The value of the threshold voltage can be 440 mV or any other suitable value in some embodiments. The threshold voltage at the gate of transistor $M_{C3}$ 775 is filtered by resistor $R_{BIG}$ 771 and capacitor $C_{BIG}$ 772.

As shown in FIGS. 7b and 7c, bias circuitry 786 and bias circuitry 757 can be used to provide bias currents for the receiver front end. A main bias current can be generated in bias circuitry 786 via a path from $V_{DD}$ to ground through transistors $M_{B19}$ and $M_{B18}$ and resistor 792. This main bias current can then be mirrored by transistor $M_{B18}$ to transistors $M_{B13}$, $M_{B14}$, and $M_{15}$ as currents $I_{MLNA}$, $I_{MB1}$, $I_{MB2}$, respectively, when transistor MB17 receives a low poweroff signal at its gate. These currents can then be used to drive three other current minors that provide bias currents to the LNA cascade 704, mixer 706, DtoSE 760, and comparator 710.

More particularly, a first current mirror is formed by transistors $M_{B2}$ 788 and $M_{B1}$ (which form the weak side of the current mirror when $M_{B1}$ receives a low poweroff signal at its gate) and transistors $M_{L2}$ 721, $M_{L4}$ 726, and $M_{L6}$ 731 (which each form a strong side of the current mirror). This current mirror then receives current $I_{MLNA}$ at $M_{B2}$ 788 and mirrors the current as bias currents to transistors $M_{L2}$ 721, $M_{L4}$ 726, and $M_{L6}$ 731 via resistors $R_{biasLNA}$.

This first current mirror can also facilitate gain control over LNAs 714, 716, and 718 in some embodiments. When used in this way, gain setting inputs G[0]-G[2] 787 set the current mirror ratio between transistors $M_{B2}$ 788, $M_{B3}$ 789, $M_{B6}$ 790, and $M_{B7}$ 791 and the common-source-connected MOSFETs $M_{L2}$ 721, $M_{L4}$ 726, and $M_{L6}$ 731 in the LNA stages. Switches $M_{B4}$, $M_{B5}$, and $M_{B8}$, once activated by inputs G[0]-G[2] 787, lower the mirror ratio, thus decreasing the bias current in the LNA stages and thus their voltage gain and power consumption.

A second current minor is formed by transistors $M_{B10}$ and $M_{B9}$ (which form the weak side of the current mirror when transistor $M_{B9}$ receives a low poweroff signal at its gate) and transistors $M_{G3}$ 742, $M_{G4}$ 743, $M_{G5}$ 744, $M_{G6}$ 745, $M_{D2}$ 762, and $M_{D3}$ 763 (which each form a strong side of the current mirror). This current mirror then receives current $I_{MB1}$ at $M_{B10}$ and mirrors the current as bias currents to transistors $M_{G3}$ 742, $M_{G4}$ 743, $M_{G5}$ 744, $M_{G6}$ 745, $M_{D2}$ 762, and $M_{D3}$ 763.

A third current mirror is formed by transistors $M_{B12}$ and $M_{B11}$ (which form the weak side of the current mirror when transistor $M_{B11}$ receives a low poweroff signal at its gate) and transistors $M_{G1}$ 740, $M_{G2}$ 741, $M_{D1}$ 761, and $N_{C1}$ 773 (which each form a strong side of the current mirror). This current mirror then receives current $I_{MB2}$ at $M_{B12}$ and mirrors the current as bias currents to transistors $M_{G1}$ 740, $M_{G2}$ 741, $M_{D1}$ 761, and $M_{C1}$ 773.

In some embodiments, in order to save power, portions of LNA cascade 704, mixer 706, DtoSE 760, HPF 708, and comparator 710 of the receiver front end can decrease power consumption in response to a "poweroff" signal.

For example, in some embodiments, cascode transistors $M_{L1}$ 713, $M_{L3}$ 715, and $M_{L5}$ 717 can be used to turn off LNAs 714, 716, and 718 when they are unbiased by inverters composed of transistors $M_{11}$ and $M_{12}$ 702, 703, and 705, respectively, in the corresponding amplifier in response to a poweroff signal "poweroff" going high. The bias current provided to transistors $M_{L2}$ 721, $M_{L4}$ 726, and $M_{L6}$ 731 of the LNAs can also be turned off in response to switches $M_{B17}$ and $M_{B19}$ turning off when the poweroff signal at their gates goes high, to transistor $M_{B16}$ forcing the Vsg voltage across transistor $M_{B13}$ to zero, and to bias current $I_{MLNA}$ feeding the current mirror including transistors $M_{L2}$ 721, $M_{L4}$ 726, and $M_{L6}$ 731 of the LNAs being turned off. However, to facilitate rapid turn-on time in the LNAs, capacitances of the gates of transistors $M_{L2}$ 721, $M_{L4}$ 726, and $M_{L6}$ 731 can be caused to remain charged while the bias current is off by capacitors $C_B$ that can save bias voltage during power off periods in some embodiments.

As another example, when an inverted poweroff signal is low (and thus the non-inverted poweroff signal is high), an inverter 753 formed by transistors $M_{11}$ 754 and $M_{12}$ 755 can be used to force active loads transistors $M_{G7}$ 746 and $M_{G8}$ 747 into the cut-off region, and thereby reduce power consumption in mixer 706.

The bias current provided to transistors $M_{G3}$ 742, $M_{G4}$ 743, $M_{G5}$ 744, and $M_{G6}$ 745 of the mixer can also be turned off in response to switches $M_{B17}$ and $M_{B19}$ turning off when the poweroff signal at their gates goes high, to transistor $M_{B16}$ forcing the Vsg voltage across transistor $M_{B14}$ to zero, and to bias current $I_{MB1}$ feeding the current mirror including transistors $M_{G3}$ 742, $M_{G4}$ 743, $M_{G5}$ 744, and $M_{G6}$ 745 of the mixer being turned off. However, to facilitate rapid turn-on time in the mixer, capacitances of the gates of transistors $M_{G3}$ 742, $M_{G4}$ 743, $M_{G5}$ 744, and $M_{G6}$ 745 can be caused to remain charged while the bias current is off by capacitors $C_B$ 755 that can save bias voltage, during power off periods in some embodiments.

The bias current provided to transistors $M_{G1}$ 740 and $M_{G2}$ 741 of the mixer can also be turned off in response to switches $M_{B17}$ and $M_{B19}$ turning off when the poweroff signal at their gates goes high, to transistor $M_{B16}$ forcing the Vsg voltage across transistor $M_{B15}$ to zero, and to bias current $I_{MB2}$ feeding the current mirror including transistors $M_{G1}$ 740 and $M_{G2}$ 741 of the mixer being turned off. However, to facilitate rapid turn-on time of the mixer, capacitances of the gates of transistors $M_{G1}$ 740 and $M_{G2}$ 741 can be caused to remain charged while the bias current is off by capacitor $C_B$ 756 that can save bias voltage during power off periods in some embodiments.

As still another example, in order to reduce power usage, transistor $M_{D6}$ 766 can disconnect the DtoSE from the power supply when poweroff is high.

The bias current provided to transistors $M_{D2}$ 762 and $M_{D3}$ 763 of the DtoSE can also be turned off in response to switches $M_{B17}$ and $M_{B19}$ turning off when the poweroff signal at their gates goes high, to transistor $M_{B16}$ forcing the Vsg voltage across transistor $M_{B14}$ to zero, and to bias current $I_{MB1}$ feeding the current mirror including transistors $M_{D2}$ 762 and $M_{D3}$ 763 of the DtoSE being turned off. However, to facilitate rapid turn-on time in the DtoSE, capacitances of the gates of transistors $M_{D2}$ 762 and $M_{D3}$ 763 can be caused to remain charged while the bias current is off by capacitor $C_B$ 755 that can save bias voltage during power off periods in some embodiments.

The bias current provided to transistors $M_{D1}$ 761 of the DtoSE can also be turned off in response to switches $M_{B17}$ and $M_{B19}$ turning off when the poweroff signal at their gates goes high, to transistor $M_{B16}$ forcing the Vsg voltage across transistor $M_{B15}$ to zero, and to bias current $I_{MB2}$ feeding the current mirror including transistors $M_{D1}$ 761 of the DtoSE being turned off. However, to facilitate rapid turn-on time of the DtoSE, the capacitances of the gate of transistors $M_{D1}$ 761 can be caused to remain charged while the bias current is off by capacitor $C_B$ 756 that can save bias voltage during power off periods in some embodiments.

As a further example, to save power consumption in HPF 708, the bias voltage generator 780 that produces Vfilter can be deactivated when the poweroff signal is high. When an Off-to-On transition of the receiver is subsequently invoked, a glitch generator voltage ($V_{glitch}$) at the gate of transistor $M_8$ 770 causes resistor $R_F$ 793 to be shorted by transistor $M_8$ 770 for very short time (e.g. about 3 ns), thus making the voltage at the gate of transistor $M_{C2}$ 774 in comparator 710 grow quickly to avoid the generation of spurious pulses.

As a still further example, to save power consumption in comparator 710, transistor $M_{P3}$ 778 disconnects the comparator from the power supply when poweroff is high. Also when poweroff is high, transistor $M_{P2}$ 779 forces the output of the comparator to logic "0". This prevents power supply switching from creating spurious pulses that feed from the comparator into the demodulator and synchronizer (FIG. 3). In addition, it forces the bias point of the two inverters 780 and 781 formed by $M_{R1}$ 782, $M_{R2}$ 783, $M_{R3}$ 784, and $M_{R4}$ 785 to zero (away from the switching point at Vdd/2).

The bias current provided to transistors $M_{C1}$ 773 of the comparator can also be turned off in response to switches $M_{B17}$ and $M_{B19}$ turning off when the poweroff signal at their gates goes high, to transistor $M_{B16}$ forcing the Vsg voltage across transistor $M_{B15}$ to zero, and to bias current feeding the current mirror including transistors $M_{C1}$ 773 of the comparator being turned off. However, to facilitate rapid turn-on time of the comparator, the capacitances of the gate of transistors $M_{C1}$ 773 can be caused to remain charged while the bias current is off by capacitor $C_B$ 756 that can save bias voltage during power off periods in some embodiments.

In some embodiments, the poweroff signal, which allows for receiver front end duty cycling, can be generated based on a time relationship between synchronization pulses and data pulses. For example, the poweroff signal can be implemented by using two counters $C_A$ and $C_B$ and a finite state machine (FSM), that are clocked by the clock output of RO 902. In such an arrangement, the delay between two synchronization pulses and between as synchronization pulse and data pulse can be sampled by counters $C_A$ and $C_B$, respectively and stored in two registers $R_A$ and $R_B$ by the FSM. The poweroff signal can be generated by the finite state machine every time the values of counters $C_A$ and $C_B$, always running, reach the delays stored in $R_A$ and $R_B$ for ever symbol. Because the RO clock is uncorrelated with received synchronization and data pulses, the start count signals of the counters can be asynchronously triggered by the fast MPE for every pulse to keep the counters synchronized while the receiver receives S-OOK modulated data and to avoid drift between the counters' values and the received pulses in time domain.

In some embodiments, to improve the effectiveness of narrow band interference (NBI) rejection in the presence of multiple jammers, it is possible to increase the filter efficiency for the ultra-wide band (UWB) pulses. This can be accomplished in some embodiments by increasing the HPF roll-off and the LPF roll-off before the 10 MHz limit and after the 250 MHz limit in order to better filter the intermodulation products resulting from self-mixing of the NBI. To mitigate receiver front-end saturation, additional interference rejection can be provided by using ad-hoc built-in notch antennas or external ceramic filters between the RF antenna and the receiver input.

Figure 8:
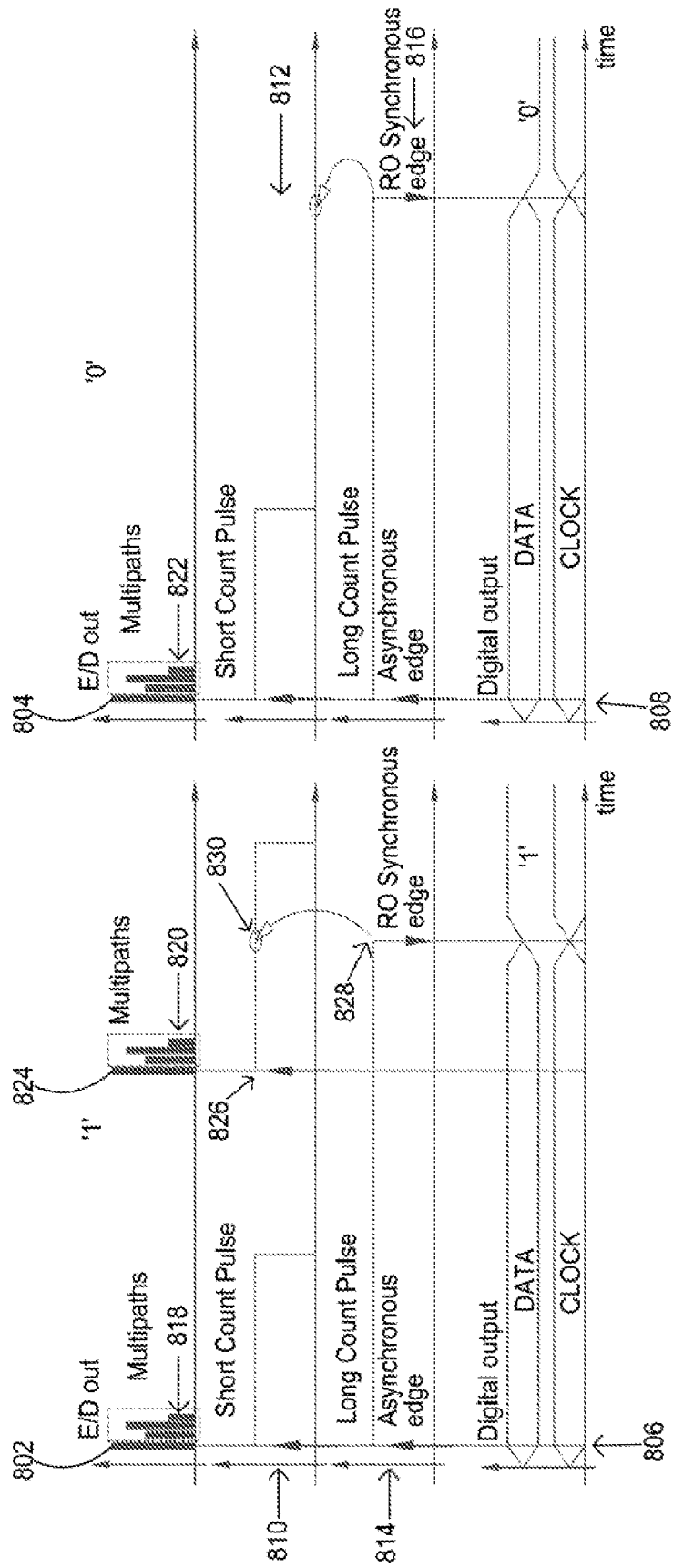
FIG. 8 is a diagram of short and long count pulses that can be generated in response to received pulses in accordance with some embodiments.

As illustrated above in connection with FIG. 3, a digital demodulator and synchronizer 312 in accordance with some embodiments can include a ring oscillator/divider (RO), a slow multi-path eraser (slow MPE), a fast multi-path eraser (fast MPE), a T-flip flop, and a D-flip flop. The MPEs can be implemented as digital circuits that asynchronously sense a first positive edge of a pulse and generate two signals each lasting a certain number of RO clock cycles (one a long count and one a short count). For example, as illustrated in FIG. 8, a first positive edge of pulses 802 and 804 can be sensed at 806 and 808, respectively. Then, the fast MPE and the slow MPE can generate short count pulses 810 and 812 and long count pulses 814 and 816, respectively.

In many instances, multi-path signals 818, 820, and 822 corresponding to received pulses 802, 824, and 804, respectively, may be received shortly after the first positive edge of the received pulses. These multi-path signals can be filtered out based on the short count pulses by ignoring any signal have a rising edge while a short count pulse is active.

These short count pulses and long count pulses can have any suitable lengths. In some embodiments, because the two MPEs are activated asynchronously, while having lengths based on the same synchronous clock, variations of up to ±33% of the nominal clock frequency may be tolerable. Because the MPEs are activated asynchronously, but finish their counts after a certain number of clock cycles, the negative edges of their pulses have a single clock cycle jitter. In order to make the single clock cycle jitter of the negative edges of the short and long count pulses small with respect to multi-paths pulse lag time (which can be about 30 ns for a residential line of sight environment, for example) and thus avoid threshold re-triggers, four and eight clock cycles can be used for the short and slow counts, respectively, in some embodiments.

After both the short and long count pulse start at the same time on a synchronization pulse, the short count pulse will expire (or go low as illustrated) before the long count pulse expires. If a data pulse is subsequently received, such as is illustrated for pulse 824, the short count pulse will be re-triggered by the fast MPE as shown at 826. When the long count pulse subsequently expires at 828, a logic "1" will be output as data by digital demodulator and synchronizer. If no data pulse is subsequently received, such as is illustrated for the time following synchronization pulse 804, the short count pulse will not be re-triggered and, when the long count pulse subsequently expires at 832, a logic "0" will be output as data by digital demodulator and synchronizer.

Figure 9:
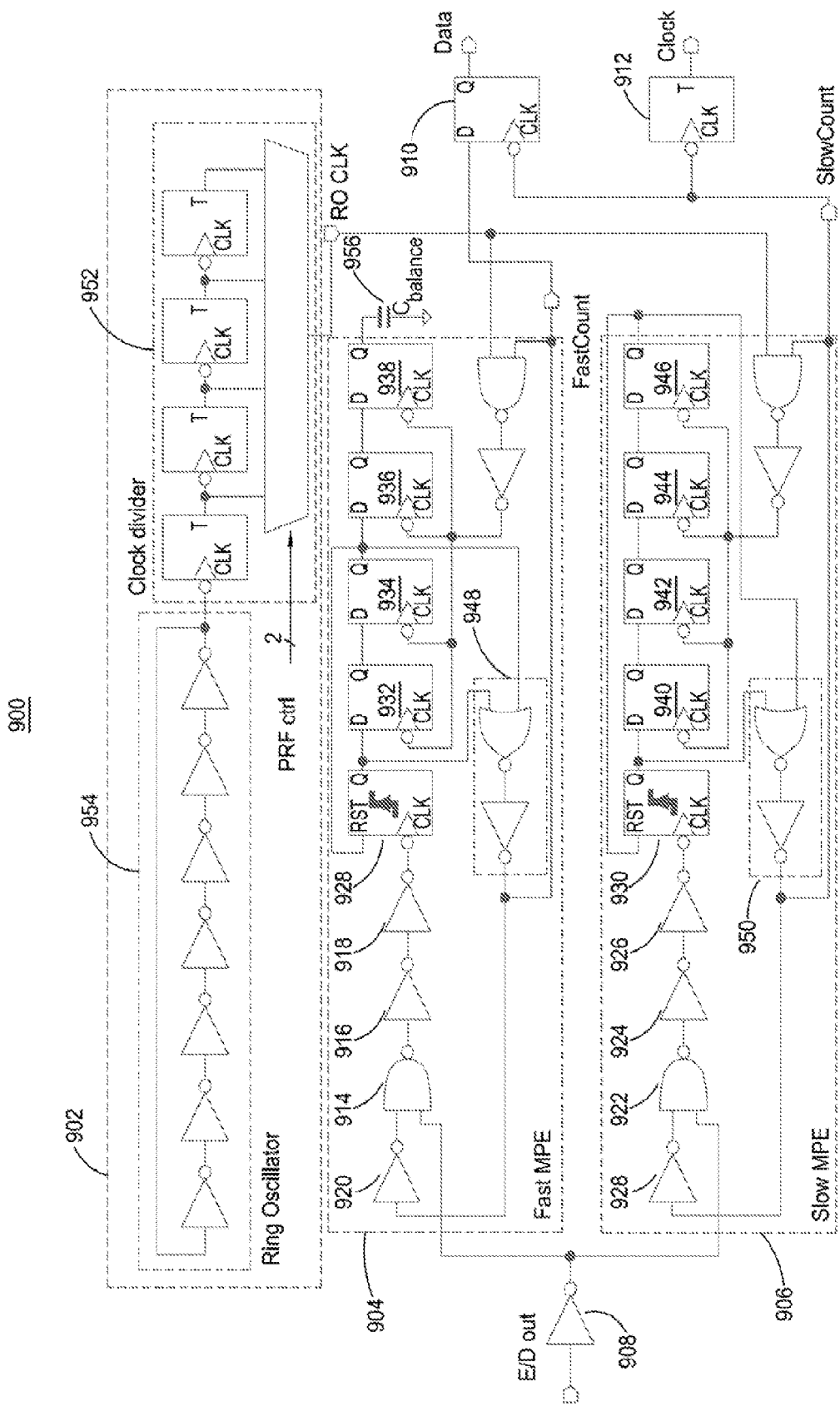
FIG. 9 is a schematic diagram of a receiver hack-end that can be used in accordance with some embodiments.

An example of a circuit 900 that can be used to implement a digital demodulator and synchronizer in accordance with some embodiments is illustrated in FIG. 9. As shown, circuit 900 includes a ring oscillator/divider (RO) 902, a fast MPE 904, a slow MPE 906, an inverter 908, a D flip-flop 910, and a T flip-flop 912.

After a digital pulse is produced by a receiver front end as described above and provided to terminal 901, the pulse can be inverted by inverter 908. The pulse can then be provided to fast MPE 904 and slow MPE 906. Within those MPEs, when in a state in which inverter 920 and inverter 928 output a logic "1", gates 914, 916, 918, 922, 924, and 926 will change state so that a falling edge occurs at the inputs to edge sensors 928 and 930. The edge sensors then asynchronously set their outputs to logic "1" in response to the rising edge being received, and OR gates 948 and 950 each output a logic "1" as the short count pulse and the long count pulse, respectively. The "1" at the outputs of the edge sensors are then propagated through D flip-flops 932, 934, 936, and 938 and 940, 942, 944, and 946 for half the number of clock cycles of the count for the corresponding MPE) until the last D flip-flops (i.e., flip-flops 934 and 946) issue a "1". These "1"s reset the edge sensors so that they output a logic "0". As the clock inputs to D flip-flops 932, 934, 936, and 938 and 940, 942, 944, and 946 continue to cycle, the output of flip-flops 934 and 946 remain at "1" until the "0"s from the edge sensors propagate through the flip-flops. The "1"s that remain at the outputs of flip-flops 934 and 936 keep the short count pulse and long count pulse at a logic "1" until the "0"s from the edge sensors propagate through the flip-flops. Once the output of flip-flops 934 and/or 946 change to "0", the corresponding edge sensors can detect the rising edge of the next pulse.

When each long count pulse transitions from a logic "1" to a logic "0", flip-flops 910 and 912 are clocked by the long count pulse. This causes the clock output at the output of T flip-flop 912 to toggle. This also causes D flip-flop 910 to latch the state of the short count pulse as the data output.

In some embodiments, the clock signal used by the MPEs is generated by a clock divider 952 from a higher-speed clock generated by a ring oscillator 954 in ring oscillator/divider (RO) 902. This clock divider outputs multiple available sub-clocks (in the illustrated example, four sub-clocks), and one of the sub-clocks is selected by a multiplexer based of a pulse repetition frequency control (PRF ctrl) input. The PRF control input can be received, from any suitable source.

In some embodiments, the possible synchronization pulse to data pulse delays are 1 μs, 0.5 μs, 250 μs and 125 μs, thus resulting in data rates of 0.5, 1, 2, 4 Mbit/s.

Figure 1:
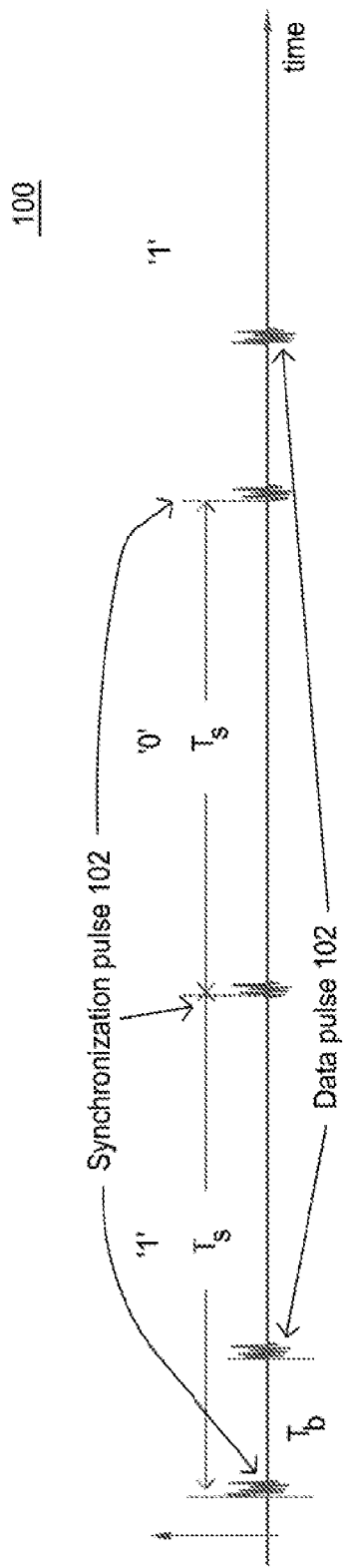
FIG. 1 is a diagram of modulation scheme that can be used in accordance with some embodiments.

The nominal frequency of the clock output by RO 902 is set such that the duration of the long count pulse output by the slow MPE is less than the pulse repetition interval (Ts) and greater than the synchronization-to-data pulse delay ($T_b$) and the duration of the short count pulse output by the fast MPE is less than $T_b$, as shown in FIG. 1.

In some embodiments, the digital demodulator and synchronizer can be implemented in static CMOS. An advantage to using static CMOS for the digital demodulator and synchronizer is that static CMOS will retain the state of the digital circuits used in the digital demodulator and synchronizer while the analog front-end is switched-off without having to wait clock cycles to set those digital circuits to a known state.

In some embodiments, the length of the shift register formed by flip-flops 932, 934, 936, and 938, and the length of the shift register formed by flip-flops 940, 942, 944, and 946 are the same in order to keep the same load for the clock signals, thus balancing the impulsive current load in the two symmetrical digital parts. In addition, D flip-flop 938 of fast MPE 904 is loaded with a dummy capacitor $C_{balance}$ 956 that models the load on flip-flop 946 of slow MPE 906. Otherwise, flip-flops 936 and 938 perform no function in fast MPE 904.

In some embodiments, the layouts of the MPEs are arranged in such a way that axial symmetry is ensured to minimize local die variations. In some embodiments, metastability probability is minimized by using four D flip-flops for the MPEs and by using a clock at the MPEs that is at least 40 MHz.

In some embodiments, the digital synchronizer and demodulator can be operated on voltage supplies ranging from 0.86 V to 1.3 V.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A receiver for receiving a wireless data transmission, comprising:
   at least one amplifier that receives an RE input signal and produces at least one amplified signal;
   a mixer that mixes the at least one signal to produce a mixed signal;
   a filter that filters the mixed signal to produce a filtered signal;
   a comparator that compares the filtered signal to a threshold voltage and produces a digital signal;
   a first pulse generator that generates a first pulse in response to a transition in the digital signal;
   a second pulse generator that generates a second pulse that is longer than the first pulse in response to a transition in the digital signal; and
   digital logic that generates a clock output and that generates a data output based on a state of the first pulse when the second pulse expires.

2. The receiver of claim 1, wherein the at least one amplifier includes three tuned low noise amplifiers that produce, as at least part of the at least one amplified signal, two signals that are phase rotated with respect to each other.

3. The receiver of claim 1, wherein the mixer performs a low-pass filter function on the mixed signal.

4. The receiver of claim 1, wherein the filter performs a high-pass filter function on the mixed signal.

5. The receiver of claim 1, wherein at least one of the first pulse generator and the second pulse generator includes an edge detector and a delay line.

6. The receiver of claim 1, further comprising a ring oscillator that produces a clock used by at least one of the first pulse generator, the second pulse generator, and the digital logic.

7. The receiver of claim 6, wherein the ring oscillator has a selectable clock frequency.

8. The receiver of claim 1, further comprising a bias circuit that reduces power consumption in at least one of the at least one amplifier, the mixer, the filter, and the comparator in response to a power consumption reduction signal.

9. The receiver of claim 1, further comprising a bias circuit that maintains a gate capacitance charge on at least one transistor in at least one of the at least one amplifier, the mixer, the filter, and the comparator during a reduced power consumption state.

10. The receiver of claim 1, wherein the digital signal includes a transition for a synchronization pulse and a transition for a data pulse encoded in the RF input signal.

11. A method for receiving a wireless data transmission, comprising:
    receiving an RF input signal and produces at least one amplified signal;
    mixing the at least one signal to produce a mixed signal;
    filtering the mixed signal to produce a filtered signal;
    comparing the filtered signal to a threshold voltage and producing a digital signal;
    generating a first pulse in response to a transition in the digital signal;
    generating a second pulse that is longer than the first pulse in response to a transition in the digital signal; and
    generating a clock output and generating a data output based on a state of the first pulse when the second pulse expires.

12. The method of claim 11, wherein the producing at least one amplified signal comprises producing two signals that are phase rotated with respect to each other.

13. The method of claim 11, further comprising performing a low-pass filter function on the mixed signal.

14. The method of claim 11, further comprising performing a high-pass filter function on the mixed signal.

15. The method of claim 11, further comprising detecting an edge of in the digital signal and generating a delay signal in response to the edge.

16. The method of claim 11, further comprising producing a clock using a ring oscillator.

17. The method of claim 16, wherein the clock is selected from one of a plurality of available clocks.

18. The method of claim 11, further comprising reducing power consumption in at least one of an amplifier, a mixer, a filter, and a comparator in response to a power consumption reduction signal.

19. The method of claim 11, comprising maintaining a gate capacitance charge on at least one transistor in at least one of an amplifier, a mixer, a filter, and a comparator during a reduced power consumption state.

20. The method of claim 11, wherein the digital signal includes a transition for a synchronization pulse and a transition for a data pulse encoded in the RF input signal.

* * * * *

UNITED STATES PATENT AND TRADEMARK OFFICE
CERTIFICATE OF CORRECTION

PATENT NO.         : 8,699,627 B2
APPLICATION NO.    : 13/498801
DATED              : April 15, 2014
INVENTOR(S)        : Marco Crepaldi et al.

Page 1 of 1

It is certified that error appears in the above-identified patent and that said Letters Patent is hereby corrected as shown below:

In the Claims:

Col. 11, line 34, (Claim 1, line 3), "receives an RE," should be --receives an RF--.

Signed and Sealed this
Twenty-second Day of July, 2014

Michelle K. Lee
*Deputy Director of the United States Patent and Trademark Office*